(12) United States Patent
Perlo et al.

(10) Patent No.: US 7,381,994 B2
(45) Date of Patent: Jun. 3, 2008

(54) LIGHT-EMITTING DEVICE USING A THREE-DIMENSION PERCOLATED LAYER, AND MANUFACTURING PROCESS THEREOF

(75) Inventors: Piero Perlo, Sommariva Bosco (IT); Marzia Paderi, Turin (IT); Nello Li Pira, Fossano (IT); Piermario Repetto, Turin (IT); Vito Guido Lambertini, Giaveno (IT); Mauro Brignone, Orbassano (IT); Rossella Monferino, Turin (IT)

(73) Assignee: C.R.F. Società Consortile per Azioni, Orbassano (Turin) (IT)

( * ) Notice: Subject to any disclaimer, the term of this patent is extended or adjusted under 35 U.S.C. 154(b) by 316 days.

(21) Appl. No.: 11/081,887

(22) Filed: Mar. 17, 2005

(65) Prior Publication Data

US 2005/0206300 A1    Sep. 22, 2005

(30) Foreign Application Priority Data

Mar. 18, 2004   (EP)   ................................ 04425193

(51) Int. Cl.
*H01L 27/15* (2006.01)
(52) U.S. Cl. .................... 257/79; 257/13; 257/103; 257/E33.001
(58) Field of Classification Search ............... 313/498; 257/E33.001, E51.019, 13, 79, 83, 84, 94, 257/101, 103
See application file for complete search history.

(56) References Cited

U.S. PATENT DOCUMENTS

| | | | | |
|---|---|---|---|---|
| 4,977,357 A | * | 12/1990 | Shrier | .......................... 338/21 |
| 6,479,146 B1 | | 11/2002 | Caruso et al. | |
| 6,858,079 B2 | * | 2/2005 | Norris et al. | .................. 117/70 |
| 6,936,854 B2 | | 8/2005 | Iwasaki et al. | |
| 7,068,418 B2 | * | 6/2006 | Kawase | ...................... 359/296 |
| 2001/0019037 A1 | * | 9/2001 | Zakhidov et al. | ............. 216/56 |

FOREIGN PATENT DOCUMENTS

| | | |
|---|---|---|
| EP | 1 309 013 | 5/2003 |
| WO | WO 03/003982 | 1/2003 |
| WO | WO 03/058728 | 7/2003 |

OTHER PUBLICATIONS

Li Pira et al, "Modeling and experimental evidence of quantum phenomena in metallic non-continuous films (metal quantum wire network—MQSN—", Proceedings of the EUSPEN. International Conference, XX, XX, vol. 1, May 27, 2001, pp. 212-215.

(Continued)

*Primary Examiner*—Kevin M Picardat
(74) *Attorney, Agent, or Firm*—Nixon & Vanderhye P.C.

(57) ABSTRACT

A process for manufacturing an electroluminescent device comprising the steps of:
  making an organic or inorganic templating frame, comprising monodispersed nanoelements, in particular nanospheres;
  providing said nanoelements with a sheath consisting of metal nanoparticles, each nanoelement with its sheath of metal nanoparticles forming a core shell.

The core shells are assembled together so as to make the three-dimensional percolated layer, having cavities whose size is around wavelength.

20 Claims, 3 Drawing Sheets

OTHER PUBLICATIONS

Colvin et al, "Light-emitting diodes made from cadmium selenide nanocrystals and a semiconducting polymer", Nature, Macmillan Journals Ltd. London, GB, vol. 370, No. 6488, Aug. 4, 1994, pp. 354-357.

Kirkpatrick, S., "Percolation and Conduction," Reviews of Modern Physics, vol. 45, No. 4, Oct. 1973, p. 574-588.

Feldheim, D.L., et al, "Electron Transfer in Self-Assembled Inorganic Polyelectrolyte/Metal nanoparticle Heterostructures," J. Am. Chem. Soc. 1996, 118, 7640-7641.

Meir, Y., "Percolation-Type Description of the Metal-Insulator Transition in Two Dimensions," Phyusical Review Letters, vol. 83, No. 17, Oct. 25, 1999, p. 3506-3509.

* cited by examiner

LIGHT-EMITTING DEVICE USING A THREE-DIMENSION PERCOLATED LAYER, AND MANUFACTURING PROCESS THEREOF

FIELD OF THE INVENTION

The present invention relates to a light emitting device, such as an electroluminescent device or an incandescent device, based on tunnel effect and using a three-dimensional percolated layer, for use in the field of photonics.

BACKGROUND OF THE INVENTION

In general, a percolated layer is a non-continuous metal layer comprising metal nanoparticles interconnected one to the other so as to ensure electric conduction.

In the case of two-dimensional percolated layers, metal nanoparticles are distributed on a single plane and interconnected one to the other so as to ensure electric conduction on the plane of the layer. In another type of percolated layer, known as three-dimensional layer, metal nanoparticles are distributed on a generic three-dimensional structure instead of a single plane.

Three-dimensional percolated structures are generally obtained by supramolecular templating techniques, which generally make use of asymmetric organic molecules as templating elements, to be removed once the metal nanoporous structure has been obtained.

The interface metal-insulator is a typical situation within a metal system under percolation, which can be met for every discontinuity of the system itself.

There are various mechanisms of electron transport through an interface metal-insulator-metal, namely ohmic conduction, ionic conduction, heat emission, emission by field effect. In a given material each of the aforesaid mechanisms dominates within a given temperature and voltage range (electric field) and has a characteristic dependence on current, voltage and temperature. These various processes are not necessarily independent one from the other.

Emission by field effect, also known as Fowler-Nordheim electron tunneling effect, consists in electron transport through an interface metal-insulator-metal due to tunnel effect. Said phenomenon takes place in the presence of strong electric fields, which can bend the energy bands of the insulator means until a narrow triangular potential barrier is built between metal and insulator. The density of emission current by field effect strongly depends on the intensity of the electric field, whereas it is basically independent from temperature, according to the following function:

$$j = \frac{C}{\phi}(\beta E^2)\exp\left(-\frac{B\phi^{3/2}}{\beta E}\right)$$

where E is the intensity of the electric field, $\phi$ is the height of the potential barrier, B, C and $\beta$ are constants.

The probability of tunneling for the electrons of Fermi Level is very low unless the barrier has a thickness below 10 Å. The critical value of the electric field above which emission by tunneling effect takes place is of about $10^9$ volt/meter.

Within a percolated metal system, and namely on every interface metal-void, there are local increases of electric field, such as to reach values of electric field intensity that are necessary for electron tunneling effect. On every discontinuity of the percolated metal system, where there is a local increase of electric field and electron emission by field effect takes place, a local increase of current density can be observed. As a matter of fact, electrons emitted by field effect, as well as those deriving from heat emission, contribute to total electric current. For this reason the percolated metal system shows a voltage-current characteristic with a non-ohmic development: the increase of current with the on applied voltage, thanks to heat emission and to emission by field effect, is faster than in an ohmic conductor with a linear characteristic.

The present Applicant has previously suggested to exploit the electron tunneling effect that can be obtained in a percolated metal structure so as to excite luminescent nanoparticles present within the structure. To this purpose, document WO03058728 describes an electroluminescent device comprising:

a glass or plastic supporting substrate;
at least two electrodes placed on the substrate;
a plurality of luminescent inclusions housed in respective cavities of the three-dimensional percolated layer,
in which the luminescent inclusions are operative to emit light when excited by electrons getting through the three-dimensional percolated layer by electron tunneling effect.

SUMMARY OF THE INVENTION

The present invention mainly aims at suggesting a new electroluminescent device based on tunnel effect or an incandescent device, comprising a three-dimensional percolated layer, for use in the field of photonics.

Said aim is achieved according to the present invention by means of a device and a process having the characteristics as in the appended claims, which are an integral and substantial part of the present invention.

Basically, according to the invention, a percolated metal structure is made, in which metal nanoparticles are assembled together to form a substantially regular three-dimensional structure having properties of photonic crystal, said structure defining a plurality of cavities whose size is in order of the visible wavelength, each cavity being at least partly delimited by a respective plurality of assembled metal nanoparticles. electroluminescence spots lay within the cavities, or are intercalated with the metal nanoparticles delimiting at least partly the cavities.

BRIEF DESCRIPTION OF THE DRAWINGS

Further aims, characteristics and advantages of the present invention shall be evident from the following detailed description and from the accompanying drawings, provided as a mere explicative and non-limiting example, in which.

DETAILED DESCRIPTION OF THE INVENTION

Figure 1:
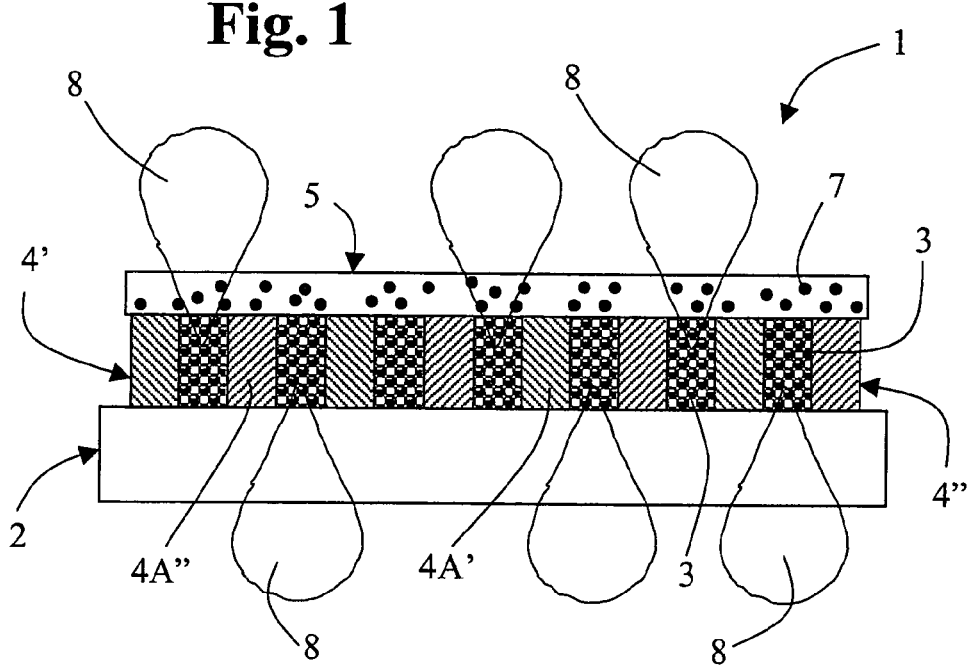
FIG. 1 is a schematic lateral section of an electroluminescent device comprising a three-dimensional percolated layer made according to the present invention.
Figure 2:
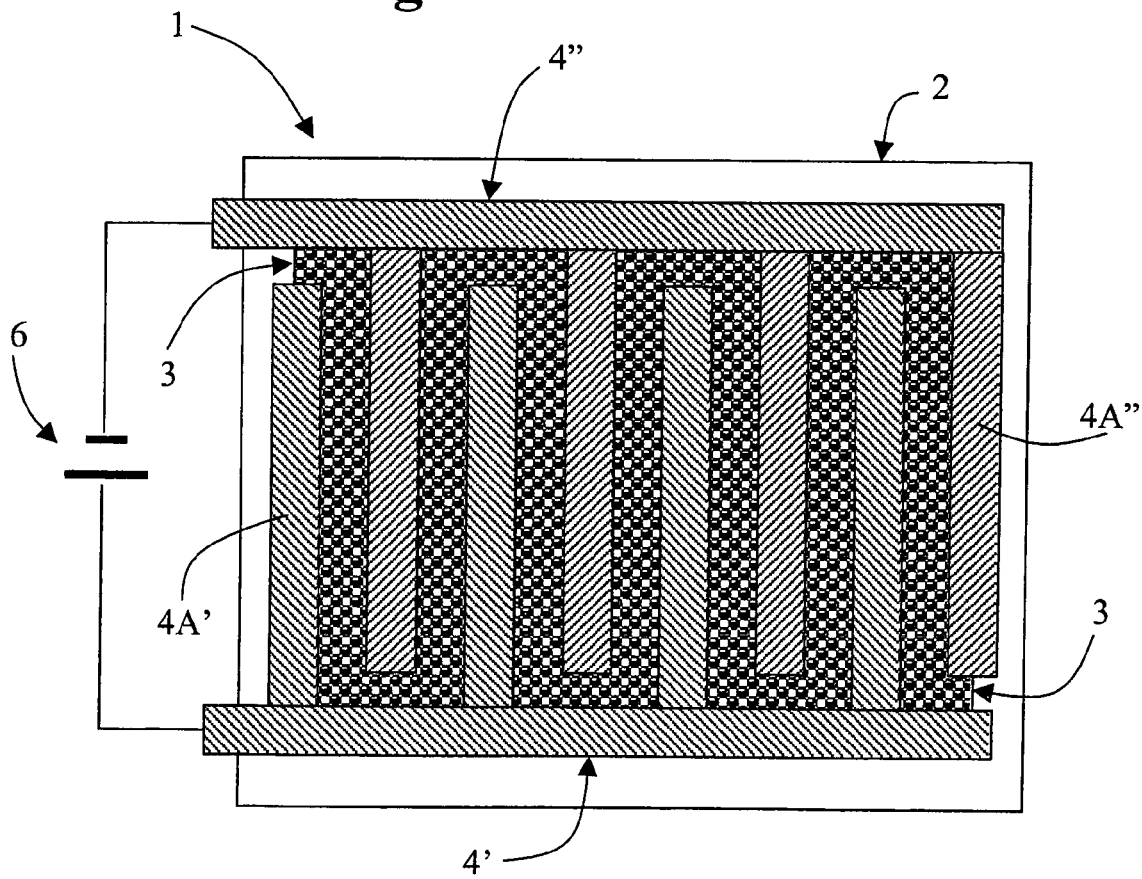
FIG. 2 is plan view of the device of FIG. 1.

In FIGS. 1 and 2 number 1 globally refers to a device for emitting light by electron tunneling effect, made according to the invention, which comprises four main parts, and namely:

a transparent substrate, referred to with 2, a three-dimensional percolated metal layer, referred to with 3, at least two metal electrodes, referred to with 4' and 4", and a protective layer, referred to with 5.

As can be seen in particular in FIG. 2, the two electrodes 4', 4" are provided with interdigitated conductive tracks, referred to with 4A' and 4A", between which the layer 3 is deposited. The electrodes 4', 4" are provided to establish the electric contact between a supply generator, schematically referred to with 6 in FIG. 2, and the three-dimensional percolated layer 3.

According to the invention, the percolated layer 3 is obtained by infiltration of metal particles into a templating element having an architecture of the three-dimensional photonic crystal type, namely having an opal-like structure.

Figure 3:
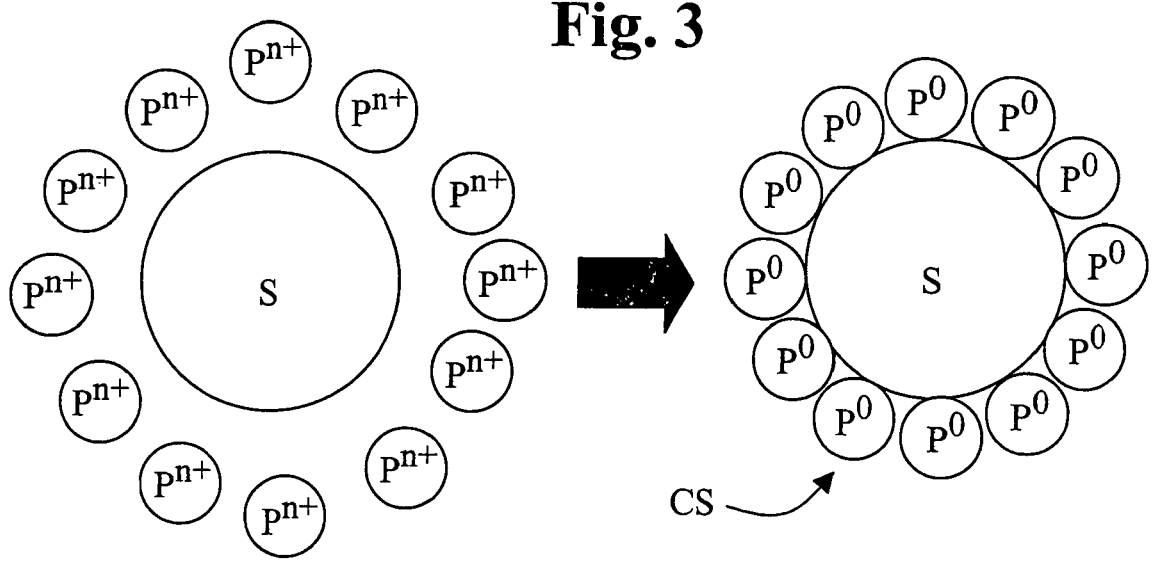
FIG. 3 is a schematic representation of a step of the process for obtaining an element of the percolated layer of the device of FIG. 1.

The layer 3 is obtained starting from an organic or inorganic templating frame consisting of monodispersed nanospheres having a diameter of 80 to 200 nanometers; one of said spheres is schematically shown in FIG. 3, where it is referred to with S. The spheres S can be made of $SiO_2$ or latex (polystyrene) and obtained by polymerization in aqueous solution of a suitable precursor.

In said solution the nanospheres S are dispersed, having the desired diameter, which according to the invention are provided with a suitable "shell" of metal nanoparticles. To said purpose, a salt of the desired metal is dissolved in the aforesaid solution and then undergoes a chemical reduction by UV rays, heat treatment or reaction with hydrogen. The metal thus shifts from n+ valence to zero valence and turns into particles, referred to with P in FIG. 3, having a diameter of few nanometers, which surround the nanospheres S. The result is thus a structure designed as core shell, globally referred to with CS in FIG. 3.

Figure 4:
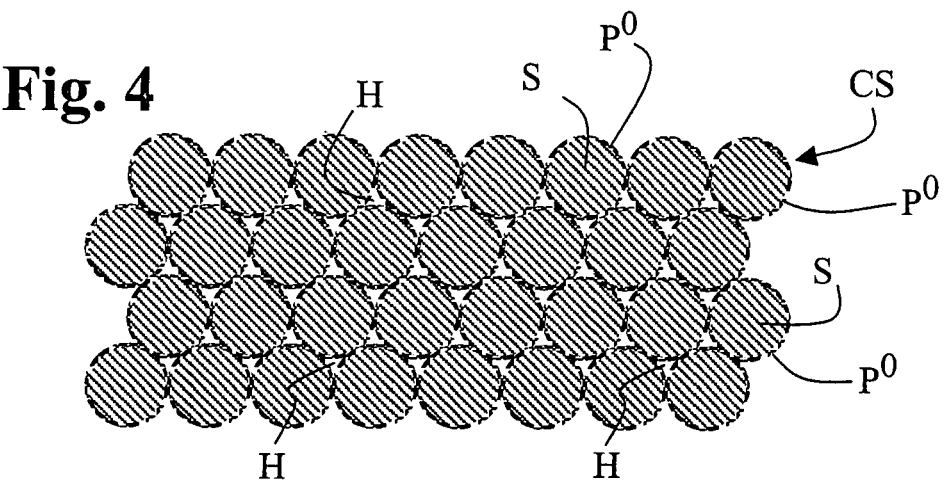
FIG. 4 is a schematic section of a first structure obtained by assembling a plurality of elements of FIG. 3.

The various core shells CS are then assembled together, for instance by forced sedimentation, thus obtaining the desired three-dimensional percolated structure, as schematically represented in FIG. 4, provided with cavities H whose size is in the order of wavelength. The distance between the metal nanoparticles P covering the nanospheres S is in the order of one nanometer.

Figure 5:
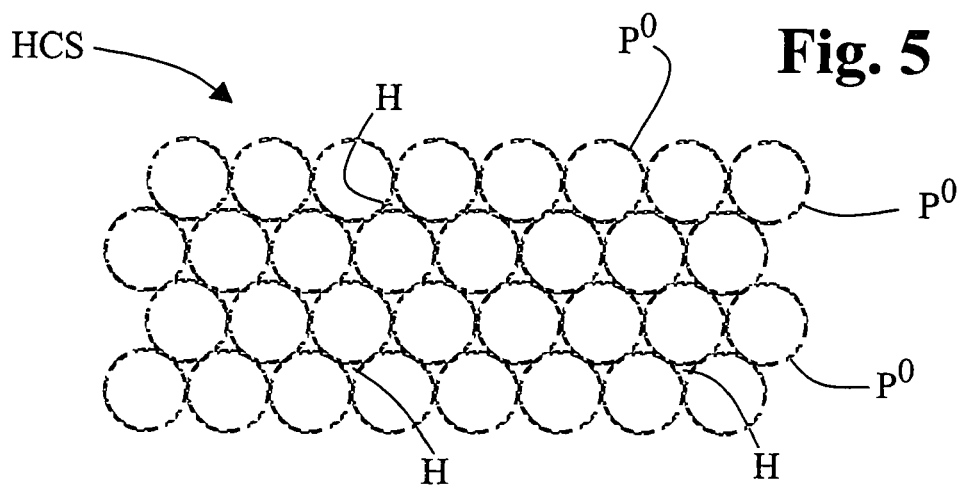
FIG. 5 is a schematic section of a second structure obtained starting from a plurality of elements of FIG. 3.

After the aforesaid three-dimensional percolated structure has been obtained, the nanospheres S can be kept within said structure, as shown in FIG. 4, or removed from the latter, as shown in FIG. 5, after a specific chemical-physical treatment, so as to obtain a structure called-hollow core shell, indicated with HCS. In this second case, if the nanospheres are made of polystyrene, the removal thereof can be achieved by heat treatment; if said nanospheres are made of $SiO_2$, they can be removed from the three-dimensional structure by treatment with diluted hydrofluoric acid.

In the preferred use described here, electrons streaming by tunnel effect through a three-dimensional percolated metal structure as obtained above are exploited for exciting electroluminescence phenomena in electroluminescent particles included in said structure. Said particles can be made of rare-earth oxides, nanoparticles of semiconductors, electroluminescent polymers. As was said, the cavities H of the three-dimensional percolated metal structure have a size around wavelength, such as to help the spontaneous emission of visible radiation from the nanoparticles included therein.

In order to include rare-earth oxides, or semiconductors in general, into the structure 3 the aqueous solution of the core shells CS is added with the respective precursors and a suitable chemical reaction is performed. Here is a list of possible techniques:

Humid Impregnation with Semiconductors

Figure 6:
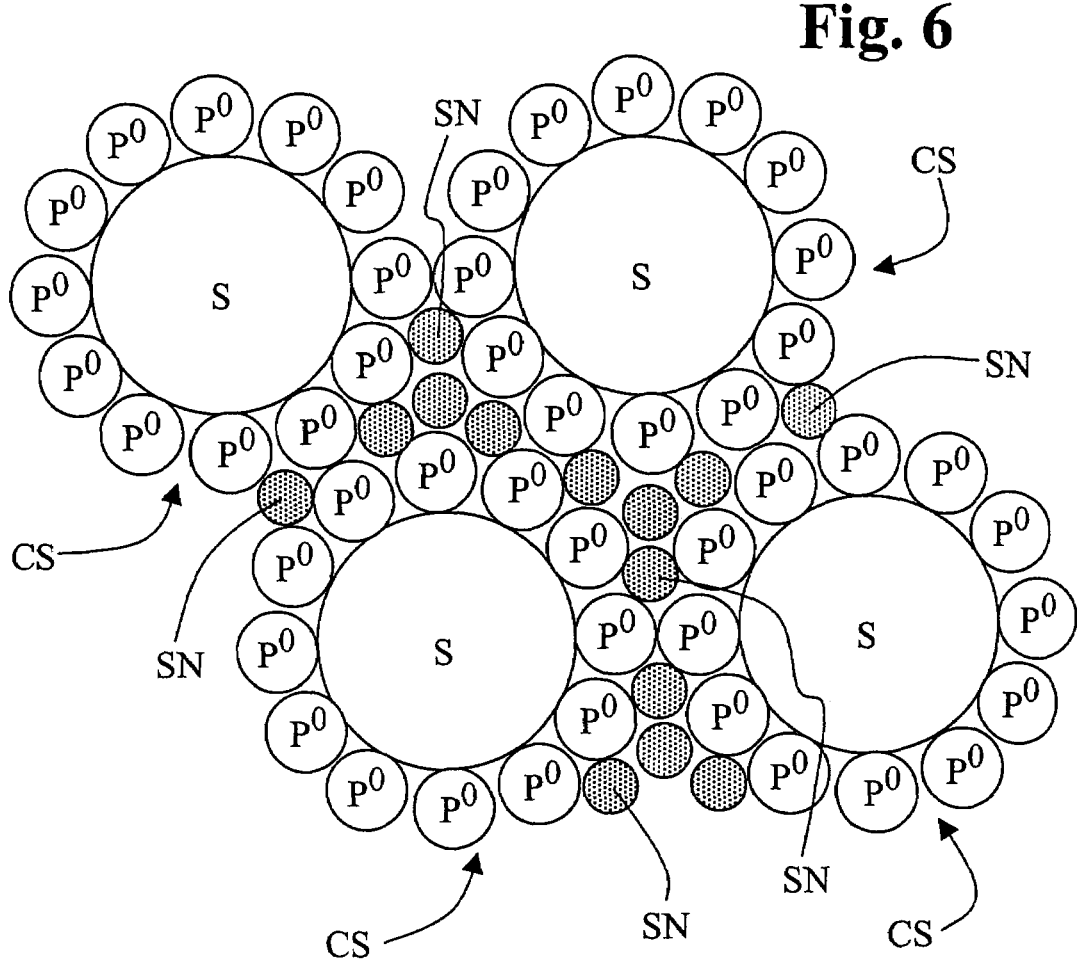
FIG. 6 is a schematic view of a portion of a percolated layer including light emitting nanoparticles, used in the device according to the invention.

In this case the solution of the core shells CS is added with an aqueous solution of a salt of the selected semiconductor, such as $Zn^{2+}$ or $Cd^{2+}$. Then an aqueous solution of sodium sulfide or selenourea is added and the whole is stirred for some minutes. Thus, nanoparticles of the selected semiconductor are built, such as CdS, ZnS, CdSe, etc., which spread into the interstices H created between one core shell and the other during sedimentation, and/or build a further outer shell embedding the core shell CS, as schematically represented at FIG. 6, where only some of the semiconductor nanoparticles are indicated with SN. Said nanoparticles behave as luminescent spots, designed to be excited by electron tunneling.

Gas Impregnation with Semiconductors

Here again, the solution of the core shells CS is added with an aqueous solution of a salt of the selected semiconductor, such as $Zn^{2+}$, $Cd^{2+}$, etc. Sulfide or telluride ion is then developed as gas ($H_2S$ or $H_2Te$) by dripping sulfuric acid into a flask containing $Na_2S$ or $Al_2Te_3$. The gas gets in contact with $Zn^{2+}$ or $Cd^{2+}$ and reacts with them so as to build semiconductor nanoparticles of semiconductor (CdS, ZnS, CdTe, etc.). Said semiconductor nanoparticles spread into the interstices between one core shell and the other and/or build a further outer shell embedding the core shell CS, again as schematically represented at FIG. 6.

Impregnation with Rare-Earth Oxides

In this case the solution of the core shells CS is added with an aqueous solution of a salt of the selected rare earth, such as $Tb^{3+}$, $Eu^{3+}$ or $Er^{3+}$. After deposition onto the substrate 2, a heat treatment turns the salt into an electroluminescent oxide.

If the excitable particles are electroluminescent polymers, their inclusion into the film of the core shells CS takes place after the latter has been laid onto the substrate 2. To this purpose, therefore, after being deposited onto the substrate 2, the film of the core shells CS is impregnated with an electroluminescent polymer using techniques depending on the type of polymer to be used, such as spin coating, dip coating, spraying, screen printing, evaporation.

The substrate 2 is preferably transparent to light and to this purpose glass or a suitable synthetic material can be used.

The electrodes 4', 4" with interdigitated tracks consist of a continuous metal layer, for instance made of copper, silver, gold or aluminum, and are deposited onto the substrate 4 by evaporation techniques, such as sputtering, thermal evaporation or electron-beam, or by serigraphy.

The subsequent deposition of the three-dimensional layer 3 of core shells CS, impregnated or to be impregnated with the electroluminescent particles H, can take place by different techniques, such as spraying, dip coating, screen printing.

The device 1 is then completed by the layer 5 so as to be protected against oxidation; deposition methods depend on the type of layer 5 used, for instance dip coating or spraying for an epoxy resin, sol gel for an inorganic oxide, screen printing, UV polymerization.

A getter (for instance barium-aluminum, zirconium-vanadium-iron, zirconium-graphite alloys, etc.) is provided for beyond the transparent layer 5. In the case shown by way of example in FIG. 1, getter inclusions, referred to with 7, are embedded into the protective layer 5 deposited as cover for the device 1.

Figure 7:
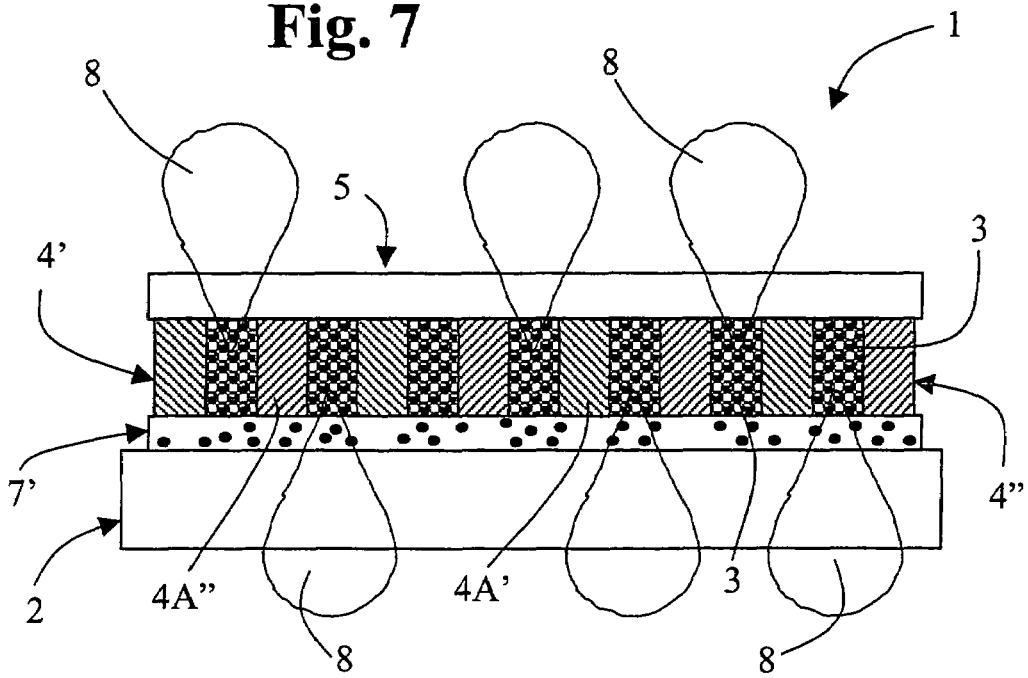
FIG. 7 is a schematic lateral section of an electroluminescent device made according to a possible variant of the present invention.

Alternatively, as can be seen in the variant of FIG. 7, the getter referred to with 7' is deposited as a layer directly onto the substrate 2 by using a convenient technique, such as evaporation, sputtering, dip coating, spraying, screen coating. In this case, the getter 7' is designed not only to prevent oxidation, but also to improve the adhesion of the electrodes 4', 4" and of the active material 3 on the substrate 2.

The device 1 operates as follows.

The electrodes 4', 4" establish the electric contact between the supply generator 6 of the device 1 and the three-dimensional percolated metal structure 3 including the electroluminescent particles SN. The electrodes 4', 4" then generate a potential difference resulting in a transport of electric charge through the layer 3. If applied voltage is high enough to give rise to very strong local electric fields ($E \approx 10^7$ V/cm), within the metal layer 3 percolation is accompanied by electron conduction by tunnel effect, which enables to excite the luminescent inclusions SN and to emit light, as schematically shown by some lobes referred to with 8 in FIGS. 1 and 7.

Summarizing, the electro luminescent device according to the invention features a tri-dimensional alternated and percolated structure obtained through dielectric nano-elements S, namely sphere-shaped, said nano-elements S forming a templating frame, emitting nano-particles SN, namely of a semiconductor, and metal nano-particles P, for electronic conduction.

The nano-elements S realize cores that are coated, according to the above described methods, with at least the metal nano-particles P; thus, the nano-particles P form shells for the cores, having a thickness of a few nanometers. The nano-elements S are packed in a regular way, so as to form a photonic crystal structure, having an ordered alternation of dielectric constant inducing total, or nearly total, wavelength reflection in function of the chosen dimensions. In particular, the ensemble of the metal nano-particles P substantially forms a structure having an inverted opal architecture, with a series of orderly arranged cavities H determined by the interstices among adjacent core-shells CS (i.e., the nano-elements S with the coating made by metal nano-particles P); said cavities H are dimensioned for inducing the band gap in which transmission of given wavelength is prohibited or privileged. Emitting nanoparticles SN are included the cavities H and/or intercalated with the metal nanoparticles P delimiting at least partly the cavities H and/or build a further outer shell embedding the core shells CS.

In a first embodiment of the invention, the cores formed by the nano-elements S are maintained, such that dielectric constant varies between the dielectric constant of air (or other means within which the structure is immersed) and the dielectric constant of the core shell system. Light emission induced by the emitting nano-particles SN is thus selected by the band gap of the photonic crystal formed by the structure made by the core shells.

In a second embodiment of the invention, the cores formed by the nano-elements S are eliminated after having been packed and coated (or vice-versa), such that a structure called hollow core shell is formed, the percolated layer thus having the shape of a regular lattice with an inverted opal architecture, made of at least the metal nano-particles P. In this case, the dielectric constant varies between the dielectric constant of air (or other means into which the structure is immersed) and the dielectric constant of the hollows core shell system, here. The hollows or cavities H determined by the elimination of the dielectric nanoelements S thus causes the variation of the dielectric constant of the system, which affects inhibition of the transmitted wavelength.

Obviously, though the basic idea of the invention remain the same, construction details and embodiments can vary with respect to what has been described and shown by mere way of example.

What is claimed is:

1. A light emitting device comprising
   a three-dimensional percolated metal layer comprising metal nanoparticles, the metal nanoparticles being distributed to define cavities of the layer,
   electroluminescence spots included in the percolated metal layer, the electroluminescence spots comprising light-emitting nanoparticles,
   a substrate for said percolated metal layer,
   at least two electrodes between which said percolated metal layer is arranged,
   a protective layer arranged on said percolated metal layer,
   a supply generator connected to the electrodes, to generate a potential difference for injecting electrons by tunnel effect through the percolated metal layer into the electroluminescence spots, to cause light emission therefrom,
   wherein said cavities are arranged according to a substantially regular three-dimensional lattice having properties of photonic crystal, said cavities including cavities having dimensions in the order of the visible wavelength to ease spontaneous emission of visible radiation from said electroluminescence spots.

2. The device according to claim 1, wherein the electrodes are provided with interdigitated conductive tracks and consist each of a continuous layer of a metal or other conductive material.

3. The device according to claim 1, wherein the emitting nanoparticles are made of a semiconductor material.

4. The device according to claim 1, wherein metal or semiconductor clusters are also included in the percolated metal, layer, to adjust light emission from the electroluminescence spots.

5. The device according to claim 1, wherein said cavities includes first and second cavities, the first cavities being smaller than the second cavities, and the electroluminescence spots
   lay within the first cavities of the percolated metal layer, and/or
   are intercalated with metal nanoparticles delimiting at least partly the first, cavities.

6. The device according to claim 1, wherein the protective layer comprises inclusions of getter to increase resistance to oxidation of the percolated metal layer.

7. The device according to claim 1, wherein said three-dimensional percolated metal layer has substantially the shape of an inverted opal.

8. The device according to claim 1, wherein the emitting nanoparticles are made of a rare-earth oxide.

9. The device according to claim 1, wherein the emitting nanoparticles are made of an electroluminescent polymer.

10. The device according to claim 1, wherein the metal nanoparticles are at a distance from each other, said distance being in the order of one nanometer.

11. The device according to claim 1, wherein the percolated metal structure includes a plurality of substantially spherical portions, each spherical portion being formed by a plurality of said metal nanoparticles assembled together.

12. The device according to claim 11, wherein each spherical portion has an inner surface and an outer surface and said cavities includes interstices defined among the outer surfaces of a number of said spherical portions.

13. The device according to claim 12, wherein a number of said electroluminescence spots are arranged within respective said interstices.

14. The device according to claim 12, comprising a number of said emitting nanoparticles surrounding a respective one of said spherical portion.

15. The device according to claim 1, wherein a getter layer is arranged between the substrate and the percolated metal layer.

16. The device according to claim 1, wherein the emitting nanoparticles are made of an electroluminescent polymer.

17. The device according to claim 1, wherein said cavities includes spherical cavities.

18. The device according to claim 17, wherein said cavities have a diameter comprised between 80 to 200 nanometers.

19. The device according to claim 17, wherein an opal-like structure formed by a plurality of assembled nanospheres is embedded into the percolated metal layer, the volume of each nanosphere defining a respective one said spherical cavities.

20. A light emitting device comprising a metal layer comprising metal nanoparticles, the metal nanoparticles being arranged to form cavities in the metal layer, electroluminescent nanoparticles, a substrate for said metal layer, at least two electrodes between which said metal layer is arranged, a supply generator connected to the electrodes, to generate a potential difference causing light emission from said electroluminescent nanoparticles, wherein said cavities are arranged according to a substantially regular three-dimensional lattice, the metal structure includes a plurality of substantially spherical portions, each spherical portion being formed by a plurality of metal nanoparticles assembled together, each spherical portion has an inner surface and an outer surface and said cavities includes first cavities, each defined among the outer surface of a number of said spherical portions, and second cavities, each delimited by the inner surface of a respective spherical portion, and wherein said electroluminescent nanoparticles are arranged within respective said first cavities, and the second cavities are spherical cavities having a diameter of 80 to 200 nanometers.

* * * * *